US008875763B2

(12) United States Patent
Paturle

(10) Patent No.: US 8,875,763 B2
(45) Date of Patent: Nov. 4, 2014

(54) MARKING OFFERING BETTER VISIBILITY AND MARKING METHOD

(75) Inventor: Antoine Paturle, Pont-du-Chateau (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 1155 days.

(21) Appl. No.: 12/083,942

(22) PCT Filed: Oct. 17, 2006

(86) PCT No.: PCT/EP2006/009980
§ 371 (c)(1),
(2), (4) Date: Apr. 23, 2009

(87) PCT Pub. No.: WO2007/045425
PCT Pub. Date: Apr. 26, 2007

(65) Prior Publication Data
US 2009/0218019 A1    Sep. 3, 2009

(30) Foreign Application Priority Data

Oct. 21, 2005  (FR) ...................................... 05 10848

(51) Int. Cl.
*B60C 13/00* (2006.01)
*B60C 11/13* (2006.01)
*B29C 33/42* (2006.01)
*B29D 30/06* (2006.01)
*B29D 30/72* (2006.01)

(52) U.S. Cl.
CPC ............. *B29C 33/424* (2013.01); *B60C 13/001* (2013.01); *B29D 2030/726* (2013.01); *B29D 30/0606* (2013.01)
USPC ..................................... 152/523; 152/209.19

(58) Field of Classification Search
USPC ................ 152/209.15, 209.19, 523; 244/130; 264/220
See application file for complete search history.

(56) References Cited

U.S. PATENT DOCUMENTS

| 4,444,713 A | | 4/1984 | Egan et al. | |
|---|---|---|---|---|
| 5,263,525 A | * | 11/1993 | Yamashita | ..................... 152/523 |
| 6,253,815 B1 | * | 7/2001 | Kemp et al. | ..................... 152/523 |
| 6,415,835 B1 | * | 7/2002 | Heinen | ..................... 152/209.21 |
| 2001/0032691 A1 | * | 10/2001 | Ohsawa | ..................... 152/209.18 |
| 2003/0111150 A1 | * | 6/2003 | Zimmer et al. | ........... 152/209.19 |
| 2003/0230370 A1 | | 12/2003 | Stubbendieck et al. | |
| 2004/0187997 A1 | | 9/2004 | Paturle et al. | |

FOREIGN PATENT DOCUMENTS

| EP | 0 416 846 | 3/1991 |
|---|---|---|
| EP | 1 063 071 | 12/2000 |
| JP | 06 106920 | 4/1994 |

* cited by examiner

*Primary Examiner* — Justin Fischer
*Assistant Examiner* — Robert Dye
(74) *Attorney, Agent, or Firm* — Cozen O'Connor

(57) ABSTRACT

Article (1) having at least one visible surface (11), this surface comprising on at least part of it a pattern (2) contrasting with the surface of the article, this pattern (2) comprising a plurality of tufts (21) distributed over the entire said pattern, each tuft (21) having an average cross section between 0.003 and 0.06 mm². Also disclosed is a moulding process for forming a high-contrast pattern on a surface of an article that can be moulded in a mould, this process consisting in producing, at the position of the pattern on the surface of the mould, a plurality of cavities of average cross section between 0.003 and 0.06 mm².

11 Claims, 2 Drawing Sheets

CROSS SECTION A-A

MARKING OFFERING BETTER VISIBILITY AND MARKING METHOD

RELATED APPLICATIONS

This is a U.S. National Phase Application under 35 USC 371 of International Application PCT/EP2006/009980, filed on Oct. 17, 2006.

This application claims the priority of French patent application no. 05/10848 filed Oct. 21, 2005, the disclosure content of which is hereby incorporated by reference.

FIELD OF THE INVENTION

The invention relates to a marking and to a process for producing such a marking on various articles, and especially, but not exclusively, articles made of plastic or rubber.

BACKGROUND OF THE INVENTION

In the field of the marking of articles, it is known to employ items attached to these articles, these items constituting a marking intended to be easily visible to an observer. This type of marking requires the use of a support medium and an adhesive between the support medium and the article. It will be readily understood that this type of marking, although quite simple, is rather difficult to implement in particular if it is designed to take into account the constraints under which the article comprising such a marking is used.

In another type of marking, the marking is produced directly on the article itself, for example by machining said marking on the surface of the article, or, when the article is obtained by moulding in a mould, by machining the marking on the mould so as to be able to reproduce it on the article during moulding.

In another implementation, a marking pattern is produced on a support medium, which is then placed in a housing in the mould.

SUMMARY OF THE INVENTION

What is desired is a type of marking integrated into the article on which it is made and exhibiting improved visibility compared with the known markings and also being sufficiently long-lasting so as to be visible after the article has been used.

The moulding process according to the invention makes it possible to obtain a marking that solves the problems mentioned above in relation to the prior art and that, while being more long-lasting, exhibits very great contrast on a surface of the same color (this surface may be black or of any other color).

According to an embodiment of the invention, a high-contrast pattern is produced on an article obtained by moulding, by producing, at the position of the pattern on a surface of the mould, a plurality of holes of average cross section between 0.003 and 0.06 $mm^2$ so as to generate the desired pattern with a density appropriate to the production of the pattern. Preferably, this density is at least 5 holes per $mm^2$ of area, said holes having a depth of at least 0.1 mm.

Thanks to this process, the mould for the article comprises a series of orifices inside which the material of the article will be moulded so as to create on said article a plurality of tufts or piles approximately parallel to one another and protruding from the surface of the article so as to form the desired pattern visibly with a high contrast.

Thanks to the marking according to the invention, it is possible with the same color as that of the article on which the marking is produced to have a marking of very high contrast, the longevity of which is ensured by the number and length of the tufts.

In an alternative implementation of the process according to the invention, the density of the holes produced on the mould can vary according to the different parts of a pattern so as to create color variation effects, thus allowing a more complex pattern to be constructed.

In another alternative implementation of this process, the holes may be produced in a support medium separate from the mould before this support medium is placed in an orifice on the mould. This allows the pattern to be easily changed without having to completely modify the mould.

In a preferred implementation of the process according to the invention, the holes are pierced by means of a laser beam.

The process and its various implementations apply in particular, but not exclusively, to the production of rubber articles, such as the manufacture of tires, whether these are black or of any other color.

One aspect of the invention relates to a marking produced on a surface of an article, this marking exhibiting very great contrast with respect to the colour of the article itself.

According to this aspect of the invention, an article having at least one visible surface is provided on at least part of this surface with a pattern forming a marked contrast with respect to the surface of the article, this pattern being characterized in that it comprises a plurality of tufts distributed over the entire said pattern, each tuft protruding from said surface and having an average cross section of between 0.003 and 0.06 $mm^2$.

Preferably, the density of the tufts on the surface of the pattern is at least five tufts per $mm^2$ so as to reduce as far as possible any bottom surface between the tufts, and especially any flat surface of the article between the tufts, and thus enhance the contrast of the pattern. Advantageously, the density is greater than 15 tufts per $mm^2$ and even more preferably greater than 100 tufts per $mm^2$.

Preferably, the average height of the tufts is at least 0.1 mm so as to ensure a greater longevity for the pattern and enhanced contrast.

Advantageously, the cross section of each tuft decreases from the surface of the article outwards, that is to say from the base of the tuft to the tip of said tuft. In this way, surfaces substantially parallel to the base surface of the article are reduced, thereby resulting in enhanced contrast. With the same objective, it is judicious to choose appropriate cross-sectional geometries for the tufts, especially a polygonal shape so that the surfaces remaining between the bases of said tufts on the surface of the article are reduced. This is achieved when the bases are in contact with one another.

Moreover, the pattern produced may reproduce a complex pattern, that is to say not only a contour defining a color surface contrasting with the base color of the article but a pattern showing parts of different contrasts within the same said pattern. Thus, the article may include the reproduction of a photograph showing gradations of the same color, these gradations contrasting with the base color of the article. To achieve this objective, the tufts forming the pattern have variable heights and cross-sectional geometries of variable form and are appropriately distributed so as to obtain color gradations. It is thus possible to manage the contrast within a given pattern.

One very advantageous application of the marking according to the invention is in the field of articles obtained by moulding a polymer material. It has been found that the marking according to the invention is particularly effective when the article is formed from a rubber material of a given color, in which the tufts making up the marking pattern may or may not be formed in the same material of the same color.

Among such articles are, in particular, tires obtained by moulding in a mould having both the function of giving the tire its shape and of carrying out the vulcanization of the rubber materials.

In the case of a tire made of rubber material, this tire may include a pattern occupying the entire visible surface so as to enhance the visibility of this surface and thus create a better impression for the entire tire. This entire surface comprises a plurality of tufts made of rubber material of the same nature as the tire, the dimensions and the density of which are chosen according to the effect desired.

It is important to note that, in addition to enhancing the visibility by greater contrast and luminance, the pattern according to the invention gives the article on which it is produced a particularly pleasant feel, of the "velvet" type, thereby adding, to the first effect, an effect that is advantageous for a great many industrial products such as, for example, vehicle fascias.

BREIF DESCRIPTION OF THE DRAWINGS

DETAILED DESCRIPTION OF THE DRAWINGS

Figure 1:
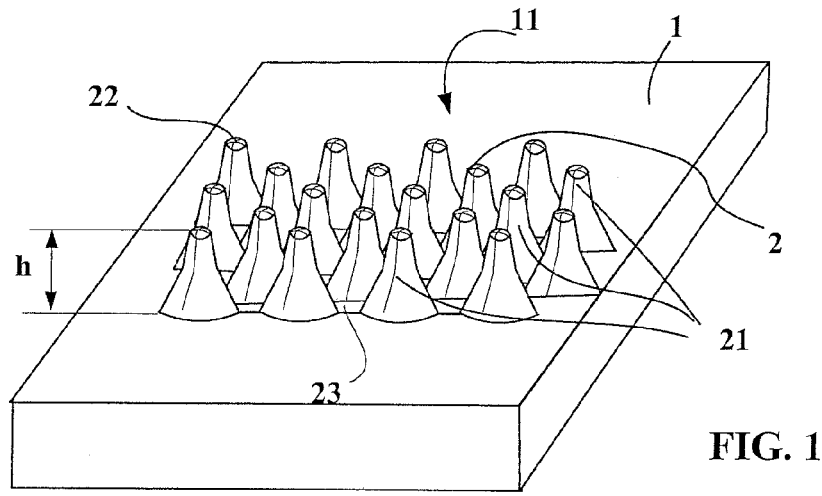
FIG. 1 shows a partial view of an article having a marking according to an embodiment of the invention on one of its surfaces.

FIG. 1 shows an article 1, one external surface 11 of which is provided with a marking 2 that is particularly visible and of high contrast at any angle of incidence of the light, thanks to the implementation of the invention.

This marking 2 is formed by a plurality of tufts 21 protruding from the surface 11 of the article 1. The contour of all of these tufts 21 on the surface of the article corresponds exactly to the contour of the marking 2. Each tuft 21 stands on a base on the surface 11 of the article and has a cross section that progressively decreases on moving away from said surface 11. Each tuft 21 has a height h equal to 0.12 mm and has a cross section at the base equivalent to that of a disc 0.15 mm in diameter (i.e. a cross section of about 0.018 $mm^2$). Moreover, each tuft 21 terminates at its end furthest away from the surface of the article in a part 22 of domed shape so as to avoid having a flat shape.

Moreover, the surface parts 23 between the bases of the tufts 21 are as small as possible so as to limit as much as possible the flat surfaces substantially parallel to the surface 11 of the article. To do this, the tuft density, that is to say the number of tufts per unit area of the article, is in the present case substantially equal to 55 tufts per square millimeter ($mm^2$).

Figure 2:
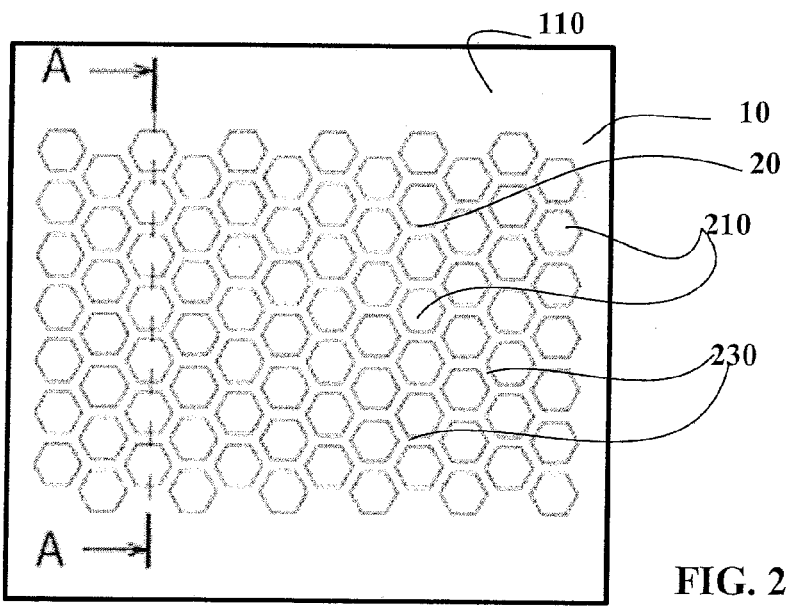
FIG. 2 shows part of a metal mould for moulding the article of FIG. 1.

FIG. 2 shows part of a metal mould 10 for moulding an article similar to that in FIG. 1, by injecting material into said mould 10. A pattern 20 of rectangular general shape is produced on part of this mould. Produced within this pattern 20 on the surface 110 of the mould is a plurality of cavities 210 (forming holes) having an average depth of 0.12 mm (preferably the depth is between 0.1 and 0.2 mm, but it may be greater) and being arranged so as to form a kind of "honeycomb" structure. This honeycomb structure is particularly beneficial as it has the advantage of reducing the surfaces remaining between the bases of the moulded tufts and thus of improving the visibility of the moulded pattern. These cavities 210 on the surface 110 of the mould 10 have a hexagonal shape with an average dimension of 0.12 mm (preferably from 0.1 to 0.2 mm).

The mould parts 230 separating each of the cavities have an average thickness of 0.03 mm on the surface of the mould, this thickness progressively increasing with depth into the mould. It is essential to reduce as far as possible the distances between the cavities on the surface of the mould, so as to reduce as far as possible the surfaces approximately parallel to the mean surface of the article on which the marking is produced. The mean surface of the article corresponds to the surface underlying the marking—the more the marking pattern is formed from surfaces that are inclined to this mean surface, the greater the visibility of said marking.

The cavities 2 are machined by means of a laser in successive passes. At each pass, a certain amount of material is removed. The bottom of each cavity has a hemispherical profile, which prevents the tip of the tufts moulded in these cavities from having flat surfaces, thereby further increasing the visibility of the marking.

Figure 3:
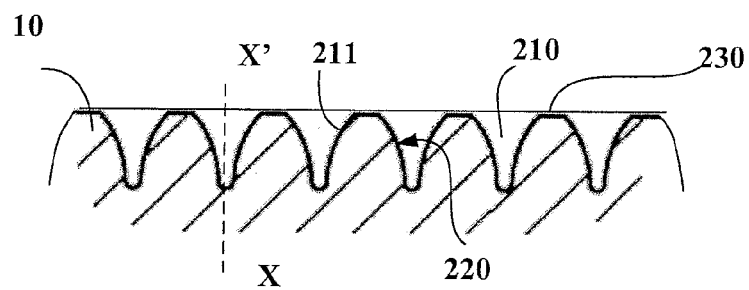
FIG. 3 shows a sectional view on the line A-A in FIG. 2.

In the embodiment shown, the shape of each cavity is symmetrical about an axis XX' approximately perpendicular to the surface of the mould, as may be seen in FIG. 3, which represents a cross section on a line A-A of the mould 10 of FIG. 2. Each cavity 210 produced in the mould has a profile approximately symmetrical about an axis XX' perpendicular to the surface of the mould. This means that the cavity is obtained by rotating the profile 211 (visible in FIG. 3) about the axis XX'. The reduction in cross section of each cavity 210 is very marked between the mould surface and two thirds of the depth of said cavities. Each cavity 210 terminates in a part 220 that is not flat but substantially hemispherical.

Figure 4:
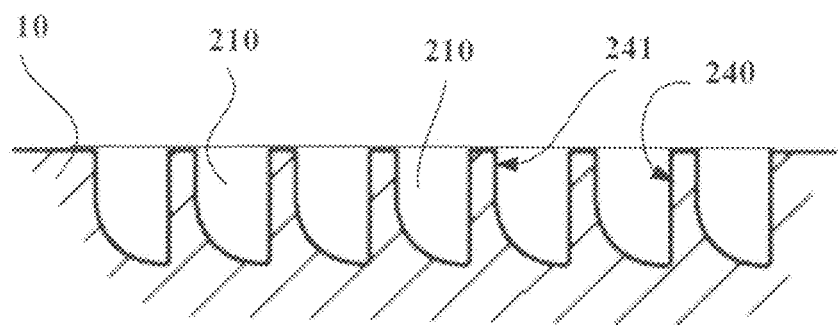
FIG. 4 shows a sectional view of an alternative form of a mould according to the invention.

In another embodiment shown in cross section in FIG. 4, the geometry of the cavities 210 is asymmetric. Each cavity has, in the depth, a flat shape 240 combined with a substantially cylindrical shape 241 (on the surface of the mould, each cavity forms an opening comprising a straight segment, the ends of which are joined by a circular arc). This embodiment makes it possible to create a contrast variation in the marking depending on the direction of observation.

Figure 5:
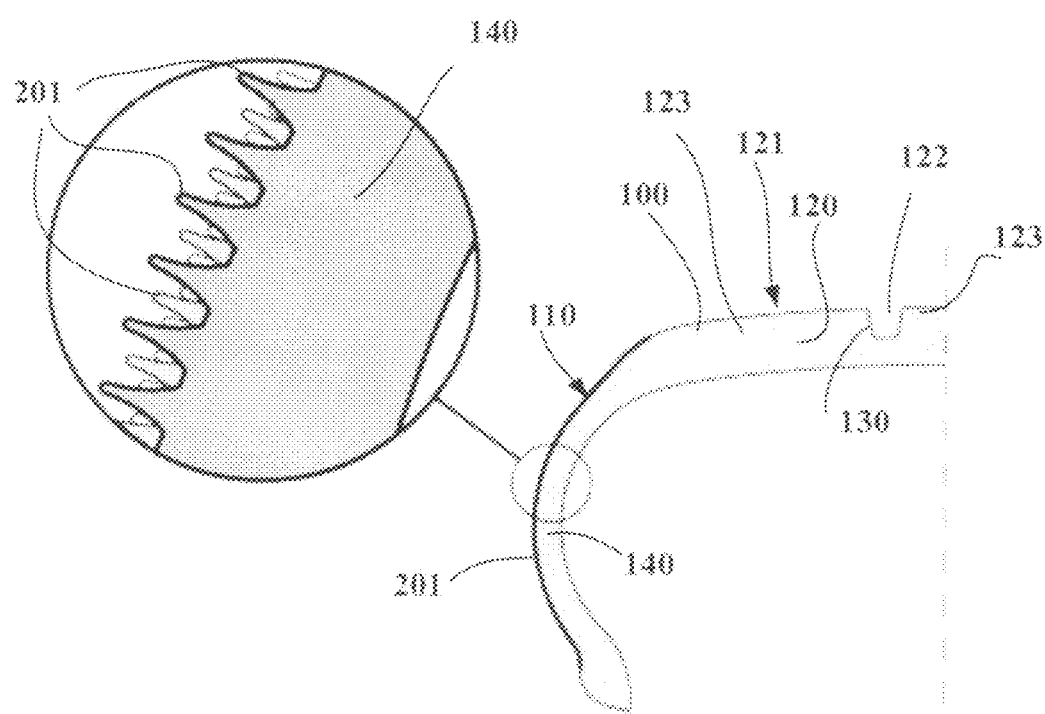
FIG. 5 shows a cross section of a tire and a detailed view of the surface of said tire.

FIG. 5 shows a tire 100 made of black rubber, said tire 100 comprising sidewalls 140 having an external surface 110 visible when the tire is fitted onto a mounting rim.

This tire 100 was moulded in a mould made up of several parts, the parts moulding the sidewalls 140 of the tire being entirely provided with a high density of cavities (greater than 100 tufts per $mm^2$) as shown in FIG. 1. After the tire 100 has been moulded, the sidewalls 140 of this tire have a very large number of approximately conical tufts 201 protruding from the surface 110 of said sidewalls, thus forming a kind of texture, the cross section of which tufts decreasing on moving away from the surface of the article. Shown in an inset of the same FIG. 5 is a localised enlargement of the surface of the sidewall, whereby the plurality of tufts forming this texture can be easily distinguished, this texture having the advantage of enhancing the black color of said sidewall.

Advantageously, the usual and statutory inscriptions giving the dimensions of the tire are also formed with a texture according to the invention.

In another embodiment (not shown), these inscriptions are not formed with this texture.

The longevity of the markings according to the invention is improved in particular by the fact that the flat surfaces visible to an observer looking at the surface of the article provided with said marking are substantially reduced.

Moreover, it is known that certain chemical elements used in the composition of rubber compounds, especially those employed for tires, can migrate to the external surfaces and stain these surfaces. Thanks to the marking according to the invention, the impact of this migration on the impairment of the marking is limited since, without preventing such migration as such, the surfaces being relatively highly inclined to the mean surface of the tire, these stains do not impair the visual perception of the sidewalls, thereby effectively increasing the longevity of said marking.

What has been presented for the sidewalls of a tire applies in a similar manner to other visible parts of the tire. In particular, a tire has a tread provided with a rolling surface 121 (as may be seen in the same FIG. 5) for coming into contact with the road when said tire is rolling thereon, this rolling surface having as a general rule a tread design formed by a plurality of relief elements 123 separated from one another by grooves 122. The marking according to the invention may be produced on the rolling surface 121 or on part of said surface (for example only on the walls 130 of the grooves 122).

The invention is not limited to the examples described and represented, it being possible to provide modifications thereto without departing from its scope. In particular, the tufts may take the form of ribs, that is to say tufts having a second dimension at least equal to twice the height of said tufts. The latter embodiment has the particular feature of providing a preferential direction along which the pattern exhibits differences in contrast and therefore in visibility in the direction of observation.

What has been presented with a single color corresponding to that of the article may be readily applied to the formation of a marking having at least one color different from that of the article.

Finally, as regards the marking process, it is possible, but in general much more expensive, to produce the tufts with the desired dimensions and in the desired arrangement directly on the tire, for example by means of a laser that progressively removes material.

In another advantageous embodiment, the marking according to the invention is produced so that the tips of the tufts are flush with the surface of the article or are set back relative to the surface of the article in a kind of housing produced on the surface of the article. Thus, it is possible to have the marking effect according to the invention while limiting the effects on said marking of the friction of the surface of the article against another object. The latter embodiment may be obtained by forming, on the moulding surface of a mould, a plurality of protuberances having an average cross section between 0.003 and 0.006 mm$^2$ and with a protuberance density of at least five protuberances per unit area expressed in square millimeters (mm$^2$). During moulding of an article in this mould, a plurality of wells are moulded on the surface of said article. The parts of material between the wells are equivalent to the tufts of the previously presented embodiments and it is thus possible to have a pattern of very high contrast on the surface of the moulded article.

The invention claimed is:

1. An article having at least one visible external surface, comprising on at least a part of the at least one visible external surface a pattern contrasting with the at least one visible external surface of the article, the pattern comprising a plurality of tufts distributed over an entirety of said pattern, each tuft of the plurality of tufts having an average cross section of between 0.003 and 0.06 mm$^2$;
   wherein a density of the plurality of tufts on the at least one visible external surface of the pattern in at least five tufts per unit area expressed in square millimeters (mm$^2$);
   wherein a cross-sectional geometry of the tufts is polygonal, said tufts having bases on the at least one visible external surface of the article which are in contact with each other so as to reduce surfaces remaining between said tufts; and
   wherein the pattern comprises tufts having varying heights and cross-sectional geometries having varying forms arranged with specific densities to obtain a pattern having variations in contrast,
   wherein the visible external surface is a sidewall of a tire.

2. The article according to claim 1, wherein the density of the plurality of tufts on the at least one visible external surface of the pattern is at least equal to fifteen tufts per unit area expressed in square millimeters (mm$^2$).

3. The article according to claim 2, wherein an average height of the plurality of the tufts is at least 0.1 mm.

4. The article according to claim 1, wherein a cross section of each tuft of the plurality of tufts decreases from a base of the tuft to a tip of said tuft.

5. The article according to claim 1, wherein a tip of each tuft has a non-flat shape.

6. The article according to claim 1, wherein said article is formed from a polymer material.

7. The article according to claim 6, wherein the article is formed from a rubber material, the plurality of tufts of the pattern being formed in a same material.

8. The article according to claim 1, wherein said article is a tire made of rubber material, the tire having a visible external surface comprising, on at least part of this visible external surface, a pattern comprising a plurality of tufts made of rubber material of a same type as the tire, so as to accentuate a visibility of said pattern.

9. the tire according to claim 8, further comprising a rolling surface for contacting a road surface while said tire rolls on the road surface, the rolling surface comprising a tread configuration formed by a plurality of relief elements separated from one another by grooves, wherein a high-contrast pattern is fanned in the tire on at least a part of the plurality of relief elements.

10. The tire according to claim 9, wherein the high-contrast pattern is produced on at least parts of materials defining the grooves to obtain greater visibility of the tread configuration of the tire.

11. The article according to claim 1, wherein the tufts distributed over a particular pattern are approximately parallel, in a height direction of the tufts, to the other tufts distributed over the particular pattern.

\* \* \* \* \*